INVENTOR.
Laurence E. Humphrey
BY
ATTORNEYS

United States Patent Office 3,452,146
Patented June 24, 1969

3,452,146
METHOD AND APPARATUS FOR LOCALIZING OVERLOAD FAILURE IN ALKALI METAL CONDUCTORS
Laurence E. Humphrey, Westfield, N.J., assignor to Union Carbide Corporation, a corporation of New York
Filed Nov. 2, 1967, Ser. No. 680,213
Int. Cl. H02g 15/28
U.S. Cl. 174—11                                        11 Claims

ABSTRACT OF THE DISCLOSURE

A method and apparatus for localizing overload failure in a polymer insulated alkali metal electrical conductor in which a preselected segment thereof is thermally insulated for thermal regeneration of the resistive heating thereof by an undesired overload current to produce an electrical discontinuity by thermo-mechanical failure. The instant method and apparatus is adapted for the inclusion of thermally actuated switch means for activating an indicator alarm prior to the thermo-mechanical failure of the preselected segment. Additional means may be included to indicate the presence of an electrical discontinuity.

Cross-references

This invention finds application for the polymer insulated alkali metal conductors disclosed and claimed in Humphrey et al. U.S. Patent No. 3,333,049 and Humphrey et al. U.S. Patent No. 3,333,050. Also related to the present invention is Humphrey et al. U.S. Patent no. 3,333,037 which discloses and claims a process for producing polymer insulated alkali metal conductors.

Background of the invention

This invention relates to an overload current protection method and apparatus for electrical conductors. More specifically, this invention relates to a method and apparatus for localizing overload failure in a polymer insulated alkali metal conductor in which a preselected segment thereof is thermally insulated for thermal regeneration of the resistive heating thereof by an undesired overload current to produce an electrical discontinuity.

Insulated electrical conductors have been proposed utilizing alkali metals as the metallic electrical conducting element. In particular, metallic sodium, as illustrative of the alkali metals, has been shown to be a particularly suitable electrical conductor for power distribution cables. Polyethylene insulated sodium conductors have recently been developed for commercial use which have considerable practical and economic advantages over the conventional aluminum and copper conductors currently employed in electric power distribution systems. Significant advantages of polyethylene insulated sodium conductors include light weight, a high degree of flexibility, immunity to work hardening, superior elongation properties, superior high voltage properties and a lower cost per unit current carrying capacity. These advantages, as well as others, are set forth in detail in the above cross-referenced U.S. patents.

In most commercial power distribution systems, the primary circuits are provided with overload protection in the form of electro-mechanical circuit breakers and fuses. Secondary circuits, such as circuits for a neighborhood or small housing development, are usually not provided with overload protection due to cost considerations.

Adequate overload protection for secondary circuits utilizing polymer insulated alkali metal conductors is considerably more critical than for secondary circuits employing conventional copper and aluminum conductors. When excessively overloaded, a polymer insulated alkali metal conductor will disconnect through the development of a discontinuity in the alkali metal conductor by the melting of the core and differential thermal expansion. However, the molten alkali metal within the insulation can heat soften the polymer and create a hazard of potential rupture, particularly in vertical risers.

It is an object of this invention to provide low cost overload protection for power distribution systems in which alkali metal cables are utilized. The present invention will find particular advantage as overload protection for buried distribution systems as a means for preventing underground cable failures.

Summary of the invention

The present invention relates to a method and apparatus for localizing overload failure in a polymer insulated alkali metal conductor consisting of an alkali metal conducting element electrically insulated by a hydrocarbon polymer having a thermal yield point. In accordance with the preferred embodiments of the present invention, the exterior surface of a preselected segment of the polymer insulated alkali metal conductor is thermally insulated by a boot, sleeve or other thermal insulation device to effectively reduce the transfer of heat from the preselected segment to the surrounding environment by conduction, convection and radiation. By effectively reducing the dissipation of resistive heat, a thermal regeneration effect is created which substantially increases the resistive heating of the preselected segment by an undesirable overload current. As the temperature of the preselected segment is increased by the thermal insulating effect of the boot, the resistivity of this insulated segment of the conductor also increases. The thermal regenerative effect thereby induced accelerates the resistive heating of the preselected segment. As the preselected segment increases in temperature, failure will occur either through mechanical disconnect of the core, through the rupture of the expanding alkali metal through the thermally yielding polymer insulation, or through the mechanical collapse and necking down of the polymer insulation to pinch off the molten alkali metal conducting element. In any event, failure produces an electrical discontinuity which disconnects the rest of the conductor from the undesired overload current. Advantageously, the preselected segment is located at a readily accessible portion of the conductor for repair or replacement of the preselected segment. In buried distribution systems employing polymer insulated alkali metal cables, an advantageous location for the preselected segment is at a vertical riser where the cable leaves the ground. Overload failure at the vertical riser is more rapid than at other locations on a buried cable due to the hydraulic head which creates an increased pressure in the cable during overload and due to the fact that the molten sodium can drain away from the upper part of the riser causing a disconnection.

In one preferred form of this invention, the insulating boot is provided with a reservoir surrounding the preselected conductor segment so that when failure occurs the alkali metal conducting element will melt and rupture through the thermally yielding polymer insulation and become entrapped in the reservoir of the boot. A second preferred embodiment of this invention encompasses an insulating boot provided with means which compressively loads the external periphery of the polymer insulation at the preselected segment so that when it is severely overloaded the loading means will compress the yielding polymer insulation to pinch off the melted alkali metal conductor and thereby produce an electrical discontinuity. Particularly useful as compression means is an elastomeric band which may be applied under tension to the outer periphery of the polymer insulation. Suitable elastomeric bands for this purpose have thermal yield points substantially greater than the thermal failure temperature of the preselected segment.

Advantageously, the heat insulating boot is provided with a heat-reflecting inner surface as a means to increase the heat insulating properties of the boot. Where desired, an adjustable, thermally actuated switch means may be provided at the preselected segment to activate an indicating alarm. Preferably the switch means is adjusted for actuation at a temperatures less than the thermal failure temperature of the preselected segment. For certain applications, a current-operated relay controlling an alarm may be utilized to indicate a current drop-out in the event of failure at the preselected segment.

Advantageously, the thermal yield point of the polymer insulation should be slightly higher than the melting point of the alkali metal conductor. As a lower limit, the thermal yield point should be sufficiently high so that an undesired overload current will not cause a failure of the insulating polymer except at the thermally insulated preselected segment.

Description of the preferred embodiments

Figure 1:
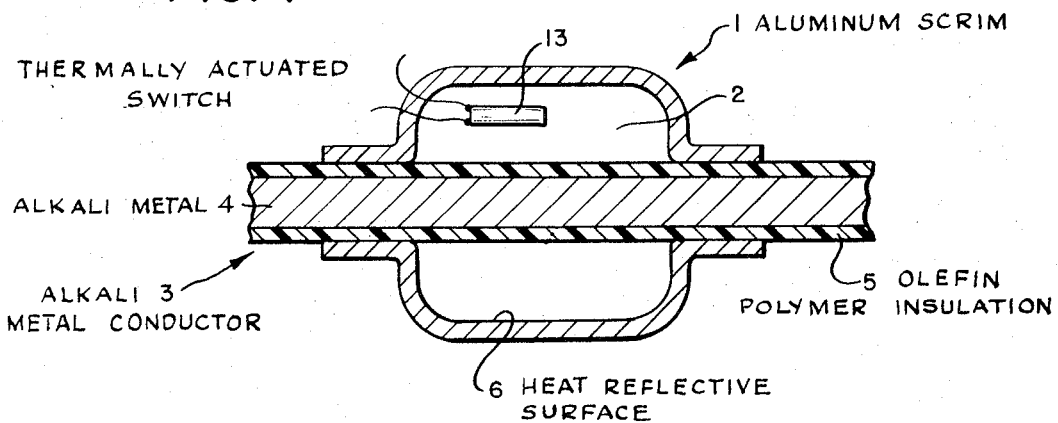
FIG. 1 is a cross-sectional view of an insulating boot incorporating a reservoir positioned at a preselected segment of a polyethylene insulated sodium conductor.

Referring to a first preferred embodiment of this invention depicted in FIG. 1, an insulating boot fabricated from aluminum scrim, generally designated 1, is positioned at a preselected segment of a polymer insulated alkali metal conductor 3 of the composition disclosed and claimed in the above cross-referenced U.S. Patents Nos. 3,333,049 and 3,333,050. Although the subject Humphrey et al. patents describe alkali metal conductors with hydrocarbon polymer insulation, it is to be understood that this invention can be employed with any flexible insulation whether it be a naturally occurring insulation such as rubber and like natural elastomers or synthetic polymers such as vinyl polymers like vinyl chloride polymers, vinyl acetate polymers, alkyl acrylate polymers, ethylene polymers, irradiated or cross-linked polymers, ionically cross-linked polymers including various copolymers and interpolymer permutations of the above. Insulating boot 1 is formed with a reservoir 2 provided with an inner heat reflecting surface 6 for reducing loss of heat by radiation from the preselected segment. As shown in FIG. 1, the polymer insulated alkali metal conductor is comprised of an alkali metal conducting element 4 and a polymer insulation 5 having a thermal yield point.

For certain applications, an adjustable thermally actuated electrical switch 13 may be included in reservoir 2 for connection by leads through the wall of boot 1 to a suitable indicating alarm. Thermally actuated switch 13 is advantageously adjusted for actuation at a threshold temperature less than the thermal failure temperature of the polymer insulated alkali metal cable 3 to thereby provide an overload warning prior to failure. Also advantageous is an indicating means which will detect an electrical discontinuity at the preselected segment.

If an undesired overload current is caused to flow through conductor 3, resistive heat will be generated along the length of the conductor which will be dissipated to the surrounding environment through thermal conduction, convection or radiation. Dissipation of the resistive heat generated in the preselected segment will be effectively reduced by the insulating effect of boot 1 to substantially increase the heating effect of the overload current. As the temperature of the preselected segment increases through the thermal insulating effect of boot 1, the resistivity of the conducting element 4 of the preselected segment will increase, thereby in turn increasing the resistive heat generated by the overload current to produce an accelerated heating of the preselected segment. When the temperature of the preselected segment reaches the melting point of the alkali metal conducting element 4, the resistivity of the preselected segment will become approximately 50% greater than that of the unmelted portion of the conducting element. Above the melting temperature of the alkali metal, the resistivity continues to increase with increase in temperature. The insulating effect of boot 1 therefore produces a thermal regeneration or feedback effect which accelerates the resistive heating of the conductor 3 in the preselected segment. In the event of failure due to rupture of the molten sodium through the thermally yielding polymer 5, the molten sodium will spill into reservoir 2 to thereby create an electrical discontinuity.

The above-described first preferred embodiment was utilized to insulate the mid-point of a fifteen-foot long test cable rated at 126 amperes in air comprised of a 0.335 inch diameter sodium metal conducting element electrically insulated by a 0.220 inch thick low density polyethylene insulation having a thermal yield point of approximately 110° C. (Substantially pure sodium metal has a melting point of 97.5° C.). Thermocouples were positioned at points one-quarter, one-half and three-quarters along the length of the sodium test cable.

A constant overload current of 230 amperes was caused to flow through the test cable. After 1.5 hours, the temperature of the cable at the preselected segment increased to 145° C. and the conductor mechanically failed—the liquid sodium bursting through the softened polyethylene insulation and spilling into the reservoir of the insulating boot. The maximum temperature of the sodium cable as measured by the thermocouples at the one-quarter and three-quarter points was 96° C. just prior to failure.

Figure 2:
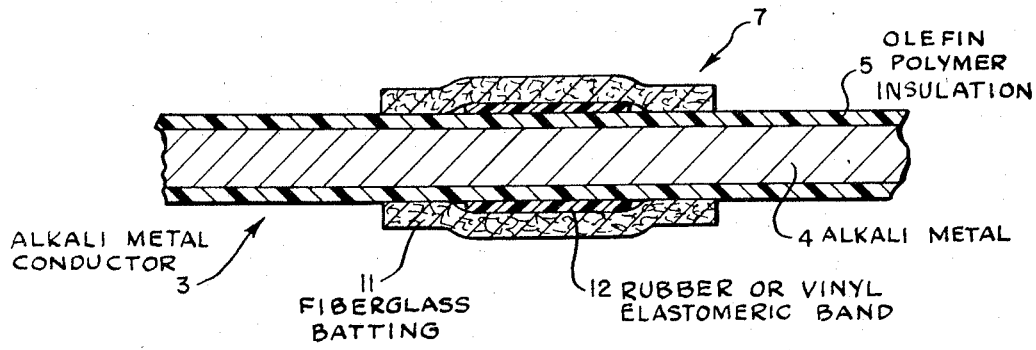
FIG. 2 is a cross-sectional view of an insulating boot incorporating an elastomeric constriction band positioned at a preselected segment of a polyethylene insulated sodium conductor.

Referring to a second preferred embodiment shown in FIG. 2, an insulating boot, generally designated 7, is positioned at a preselected segment of a polymer insulated alkali metal conductor 3 of the composition disclosed and claimed in the above cross-referenced U.S. Patents Nos. 3,333,049 and 3,333,050. As shown in FIG. 2, conductor 3 is comprised of an alkali metal conducting element 4 and a polymer insulation 5. The insulating boot 7 is comprised of an insulating packet 11. Underneath jacket 11 is an elastomeric constriction band 12 applied to the exterior periphery of polymer insulation 5 under tension. Suitable elastomeric bands for this purpose have thermal yield points substandtially greater than the failure temperature of the polymer insulated alkali metal cable. Particularly suitable for this purpose are rubber and vinyl pressure sensitive tapes which are commonly utilized for electrically insulating splices in electrical cables.

As an undesired overload current is caused to flow through conductor 3, insulating boot 7 will substantially increase the resistive heating effect of the preselected segment through the thermal regeneration effect described above in connection with the first preferred embodiment. As the temperature of the preselected segment reaches the failure tempertaure of the polymer insulated alkali metal conductor 3, the melting alkali metal conducting element 4 and the thermally yielding polymer jacket 5 will sufficiently soften to yield to the compressive pressure of elastomeric constriction band 12 which will neck down the polyethylene insulation 5 and pinch off the alkali metal conducting element 4 to produce an electrical discontinuity.

For certain applications, a thermally actuated switch may be incorporated at the preselected segment for activating an indicator alarm prior to thermo-mechanical failure. Additional means may be included to indicate the presence of an electrical discontinuity. Advantageous designs for these warning means are well known and are not described herein. An insulating boot incorporating the above-described second preferred embodiment was utilized to insulate the mid-point of a polyethylene insulated sodium test cable which was supported vertically from water-cooled electrical connectors. Thermocouples were located at points one-quarter, one-half and three-quarters along the length of the sodium conductor. The insulating boot was comprised of a two-inch fiberglass batting 8½ inches long having a thin reflective layer of aluminum foil located adjacent to the outer periphery of the polyethylene jacket. A wrapping of black vinyl electrical tape under tension was loctaed underneath the fiberglass batting to assert a compressive load upon the outer periphery of the polyethylene insulation. The test cable was comprised of a 0.335 inch diameter sodium conducting element insulated by a 0.220 inch thick low density polyethylene having a thermal yield point of approximately 110° C.

The test cable having an operating rating of 126 ampers in air was subjected to an overload current of 250 amperes for 30 minutes until the conductor failed by constriction of the cable by the elastomeric band. The temperature of the uninsulated cable at the one-quarter and three-quarter points was found to be 96° C. when the preselected segment failed. The temperature of the preselected cable segment under the insulating boot at failure was found to be 98° C.

Three additional runs were made at different overload currents utilizing similar sodium cable and insulating boots provided with elastomeric constriction bands. The results of these four runs together with the above described run are summarized below in table.

TABLE

| Run No. | Overload current, (amp.) | Time to failure | Temperature of cable at failure, ° C. | |
|---|---|---|---|---|
| | | | Under boot | Uninsulated |
| 1 | 250 | 30 min | 98 | 96 |
| 2 | 220 | 50 min | 100 | 96 |
| 3 | 200 | 1 hr. 28 min | 145 | 96 |
| 4 | 190 | 4 hrs. 24 min | 157 | 96 |

In the above described second preferred embodiment, a variety of compression means might be utilized in place of an elastomeric band under tension. In particular, a spring loaded pinch off band, rod or blade are particularly suitable as compression means contacting at least a portion of the periphery of the insulation so as to pinch off the melted alkali metal conductor and produce an electrical discontinuity. The compression means may be independent or may form an integral part of the insulating boot, switch or alarm signalling means.

Although the above described preferred embodiments illustrate sodium as the conducting element, it is understood that any other alkali metal may be used. While preferred embodiments have been described above, it will be appreciated by those skilled in the art that many modifications and variations may be made therein without departing from the spirit and scope of the invention as it is defined in the appended claims.

I claim:
1. The combination of an insulated alkali metal electrical conductor with an apparatus for localizing the overload failure thereof at a preselected segment comprising:
    (a) a conducting element of alkali metal,
    (b) a flexible electrical insulation encasing said conducting element,
    (c) a thermal insulating means surrounding said preselected segment to substantially reduce the dissipation of resistive heat therefrom.
2. The combination described in claim 1 in which thermally activated switch means is provided for activating an indicator alarm at a temperature less than the thermal failure temperature of the insulation.
3. The combination described in claim 1 in which a thermally actuated switch is contained in said thermally insulating means.
4. The combination described in claim 1 in which said thermal insulating means is a boot provided with a reservoir surrounding said preselected segment for collecting melted alkali metal from the rupture of said flexible electrical polymer insulation.
5. The combination described in claim 4 in which said thermal insulating boot is provided with a heat reflecting inner surface.
6. The combination described in claim 1 in which means is provided for compressively loading at least a portion of the periphery of said flexible electrical insulation at said preselected segment.
7. Apparatus for localizing overload failure in polymer insulated alkali metal electrical conductors comprising:
    (a) a thermal insulating boot for covering a preselected segment of said conductor to substantially reduce the dissipation of resistive heat therefrom;
    (b) means for compressively loading at least a portion of the periphery of the polymer insulation of said preselected segment so that when said segment is resistively heated to its thermal failure temperature by an overload current, said means will compress the polymer insulation to pinch off the alkali metal conducting element to produce therein an electrical discontinuity.
8. Apparatus for localizing overload failure in polymer insulated alkali metal electrical conductors comprising:
    (a) a thermal insulating boot for covering a preselected segment of said polymer insulated alkali metal conductor, said boot having a sufficiently low heat conductivity to substantially reduce the dissipation of heat from said preselected segment to thereby increase by thermal feedback the resistive heat produced by an undesired overload current, and
    (b) a reservoir incorporated into said thermal insulating boot surrounding said preselected segment for collecting melted alkali metal in the event of rupture of the thermally yielding polymer insulation.
9. A method for localizing overload failure in an insulated alkali metal electrical conductor, said method comprising the step of thermally insulating a preselected segment of said insulated alkali metal conductor to substantially reduce the dissipation of resistive heat from said preselected segment to produce therein an electrical discontinuity.
10. A method for localizing overload failure in a polymer insulated alkali metal electrical conductor according to claim 9 which includes the additional step of collecting melted alkali metal from the rupture of the polymer insulation in a zone surrounding said preselected segment.
11. A method for localizing overload failure in a polymer insulated alkali metal conductor according to claim 9 which includes the additional step of compressively loading at least a portion of the outer periphery of the insulation of said preselected segment, whereby said polymer insulation will be compressed to pinch off said alkali metal conducting element to produce therein an electrical discontinuity upon the melting of the alkali metal conductor.

References Cited

UNITED STATES PATENTS

| 3,294,941 | 12/1966 | Mullen | 327—298 |
| 3,046,536 | 7/1962 | Sciuto | 337—415 X |
| 2,835,779 | 5/1958 | Kazan | 337—107 X |
| 1,957,565 | 5/1934 | Wheeler | 200—143 |

FOREIGN PATENTS

| 308,787 | 6/1917 | Germany. |
| 973,315 | 2/1951 | France. |

LEWIS H. MYERS, *Primary Examiner.*

A. T. GRIMLEY, *Assistant Examiner.*

U.S. Cl. X.R.

337—341, 376, 415